(12) United States Patent
Chuang et al.

(10) Patent No.: US 9,245,077 B2
(45) Date of Patent: *Jan. 26, 2016

(54) METHOD FOR DESIGNING POWER DISTRIBUTION NETWORK OF CIRCUIT SYSTEM AND RELATED CIRCUIT SYSTEM

(71) Applicant: MEDIATEK INC., Hsin-Chu (TW)

(72) Inventors: Chia-Lin Chuang, Hsinchu (TW); Kuo-Sheng Wu, Taipei (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/255,970

(22) Filed: Apr. 18, 2014

(65) Prior Publication Data

US 2014/0210079 A1 Jul. 31, 2014

Related U.S. Application Data

(63) Continuation of application No. 13/071,517, filed on Mar. 25, 2011, now Pat. No. 8,742,618.

(51) Int. Cl.
| | |
|---|---|
| *G06F 17/50* | (2006.01) |
| *H01L 21/66* | (2006.01) |
| *H01L 23/498* | (2006.01) |

(52) U.S. Cl.
CPC ........ *G06F 17/5072* (2013.01); *G06F 17/5063* (2013.01); *H01L 22/14* (2013.01); *H01L 23/49811* (2013.01); *G06F 2217/78* (2013.01); *H01L 2924/0002* (2013.01); *Y10T 307/492* (2015.04); *Y10T 307/50* (2015.04)

(58) Field of Classification Search
None
See application file for complete search history.

(56) References Cited

U.S. PATENT DOCUMENTS

| | | | | |
|---|---|---|---|---|
| 6,028,440 | A * | 2/2000 | Roethig et al. | 324/760.02 |
| 6,308,307 | B1 * | 10/2001 | Cano et al. | 257/207 |
| 6,815,828 | B1 * | 11/2004 | Coronel et al. | 257/777 |
| 2007/0094630 | A1 * | 4/2007 | Bhooshan | 716/13 |
| 2009/0132988 | A1 * | 5/2009 | Chuang | 716/12 |
| 2010/0285637 | A1 * | 11/2010 | Khan et al. | 438/122 |

* cited by examiner

*Primary Examiner* — Jared Fureman
*Assistant Examiner* — Aqeel Bukhari
(74) *Attorney, Agent, or Firm* — Winston Hsu; Scott Margo

(57) ABSTRACT

A method for designing a power distribution network of a circuit system includes the following steps: determining positions of a plurality of power source nodes; estimating a current distribution condition of the circuit system; and creating a first part of the power distribution network according to at least the positions of the power source nodes.

13 Claims, 8 Drawing Sheets

METHOD FOR DESIGNING POWER DISTRIBUTION NETWORK OF CIRCUIT SYSTEM AND RELATED CIRCUIT SYSTEM

CROSS REFERENCE TO RELATED APPLICATIONS

This continuation application claims the benefit of U.S. application Ser. No. 13/071,517, filed on Mar. 25, 2011 and incorporated herein by reference.

BACKGROUND OF THE INVENTION

1. Field of the Invention

The present invention relates to circuit designs, and more particularly, to power distribution network designs of integrated circuit designs.

2. Description of the Prior Art

In an integrated circuit design, a power/ground (P/G) network which distributes power voltages and/or ground voltages from power source locations to each circuit block (e.g., macro or cell) of an integrated circuit system is essential. No matter the type of integrated circuit system (e.g., a chip, such as a wire-bond chip or a flip chip), each circuit block that provides at least a function has to be connected to a power source (e.g., VDD) and a ground source (e.g., VSS) to be functional.

For modern circuit designs, the architectures of the P/G networks face grave challenges. Due to the fast switching frequencies and increasing power consumption of the latest integrated circuit systems, large switching currents intermittently occur at the power and ground networks, thereby degrading the performance and reliability of the integrated circuit system. Moreover, the resistance of the power traces constituting the P/G network leads to a voltage drop (i.e., IR drop) over the power source nodes to the center of the P/G network. Sometimes the excessive voltage drop across the power network, or the ground bounce across the ground network, will reduce the switching speeds of the circuit system and shrink the noise margins of the integrated circuit system, which may lead to functional failures. In addition, the large current across the P/G network may cause the power traces in the metal wires to be worn out as a result of electronic migration (EM). The electronic migration diminishes the reliability of the integrated circuit systems; in a worst case, it may result in eventual losses of one or more connections of the P/G network, thereby leading to intermittent failure of the whole integrated circuit system.

It is therefore an objective in the field to design a robust power network and/or ground network that uses a smaller area of metal wires while still assuring reliability of the functionality of an integrated circuit system.

SUMMARY OF THE INVENTION

It is therefore an objective of the claimed invention to provide methods for designing a power distribution network of a circuit system which has a lower IR drop across the power distribution network and provides robust power distribution network exemption from being damaged by the electronic migration, and a circuit system thereof.

According to a first exemplary embodiment of the present invention, a method for designing a power distribution network of a circuit system is provided. The method comprises the following steps: determining positions of a plurality of power source nodes; and creating a first part of the power distribution network according to at least the positions of the power source nodes.

According to a second exemplary embodiment of the present invention, a circuit system is provided. The circuit system comprises: a plurality of power source nodes; and a power distribution network, coupled to the power source nodes where the power distribution network includes a plurality of power traces, wherein a density of power traces disposed in a first partial area of the power distribution network is greater than a density of power traces disposed in a second partial area of the power distribution network, and a shortest distance among distances between the first partial area and the power source nodes is shorter than a shortest distance among distances between the second partial area and the power source nodes.

According to a third exemplary embodiment of the present invention, a circuit system is provided. The circuit system comprises: a plurality of power source nodes; and a power distribution network coupled to the power source nodes where the power distribution network includes a plurality of power traces, wherein a width of at least one power trace disposed in a first partial area of the power distribution network are greater than a width of at least one power trace disposed in a second partial area of the power distribution network, and a shortest distance among distances between the first partial area and the power source nodes is shorter than a shortest distance among distances between the second partial area and the power source nodes.

According to a fourth exemplary embodiment of the present invention, a method for designing a power distribution network of a circuit system is provided. The method comprises the following steps: estimating a current distribution condition of the circuit system; and creating a first part of the power distribution network according to at least the current distribution condition of the circuit system.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to ... " Also, the term "couple" is intended to mean either an indirect or direct electrical connection. Accordingly, if one device is coupled to another device, that connection may be through a direct electrical connection, or through an indirect electrical connection via other devices and connections.

Figure 1:
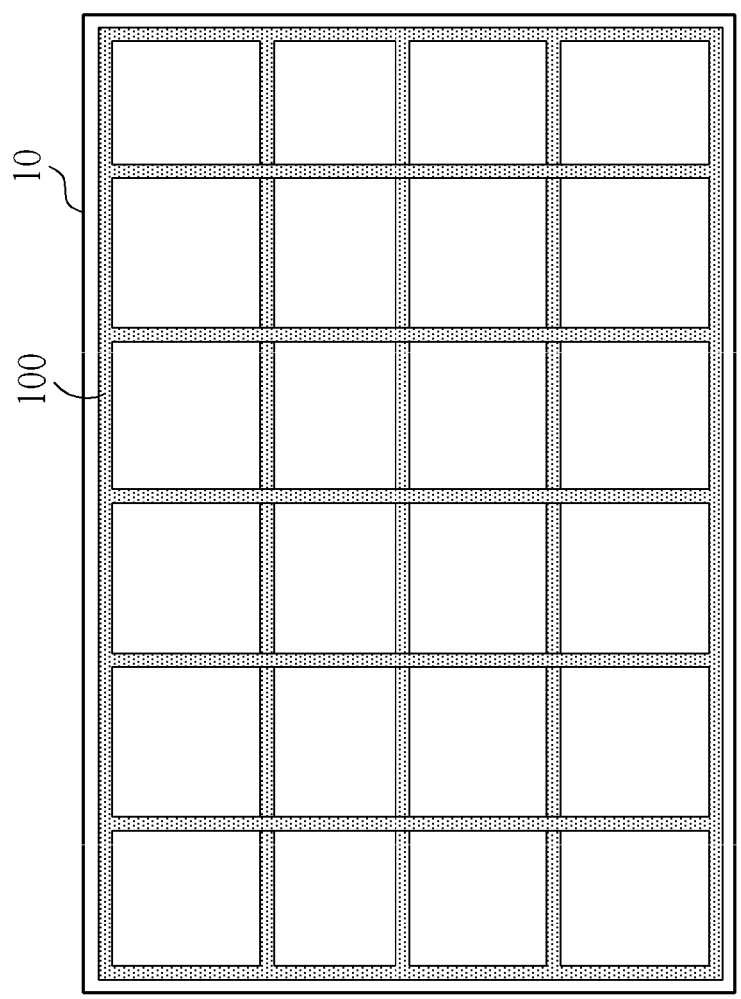
FIG. 1 is a diagram illustrating a power mesh on a circuit system.

FIG. 1 is a diagram illustrating a power distribution network 100 having a mesh structure on a circuit system 10. Besides, the structure of power distribution network can vary, for instance, a power distribution network can be formed by combining a ring type structure with a mesh structure. A power distribution network can be a power network or a ground network, that is, when the power source nodes of the power distribution network accepts a power voltage (e.g., VDD voltage), it's a power network; when the power source nodes of the power distribution network accepts a ground voltage (e.g., VSS voltage), it's a power network. A power distribution network has a plurality of power source nodes (e.g., power pads for wire bond chips or bump balls for flip chips). In the foregoing descriptions of FIG. 1, the circuit system 10 is an integrated circuit system, and it can be referred to as chips (or a die as is well-known by people skilled in this art), and the power distribution network 100 can be a power network when it transmits a power voltage, or a ground network when it transmits a ground voltage. Moreover, power distribution network 100 can be formed by power traces placed on at least one metal wiring layers. Since the structures of the power traces and metal wiring layers are well known by peopled skilled in this art, further descriptions are omitted for the sake of brevity.

To go into details, the power distribution network can be categorized into power networks which connect power source node(s) for providing a power voltage/current, and ground networks which connect power source node(s) for providing a ground voltage (e.g., VSS). That is, the power distribution network 100 in FIG. 1 can be a ground network when the power source nodes corresponding to the power distribution network 100 accept ground voltage (e.g., VSS voltage. As mentioned above, the power distribution networks with corresponding power source nodes for receiving the ground voltage are called "ground networks". Please note in the following description, the embodiments for power networks corresponding to power voltages are for illustrative purposes only, and not meant to be a limitation of the present invention; the present invention can also be applied to the designs of ground networks. The present invention is not limited to power networks corresponding to the power voltage of the integrated circuit system; ground networks can be formed according to the descriptions herein. These ground networks also obey the spirit of the present invention.

Figure 2:
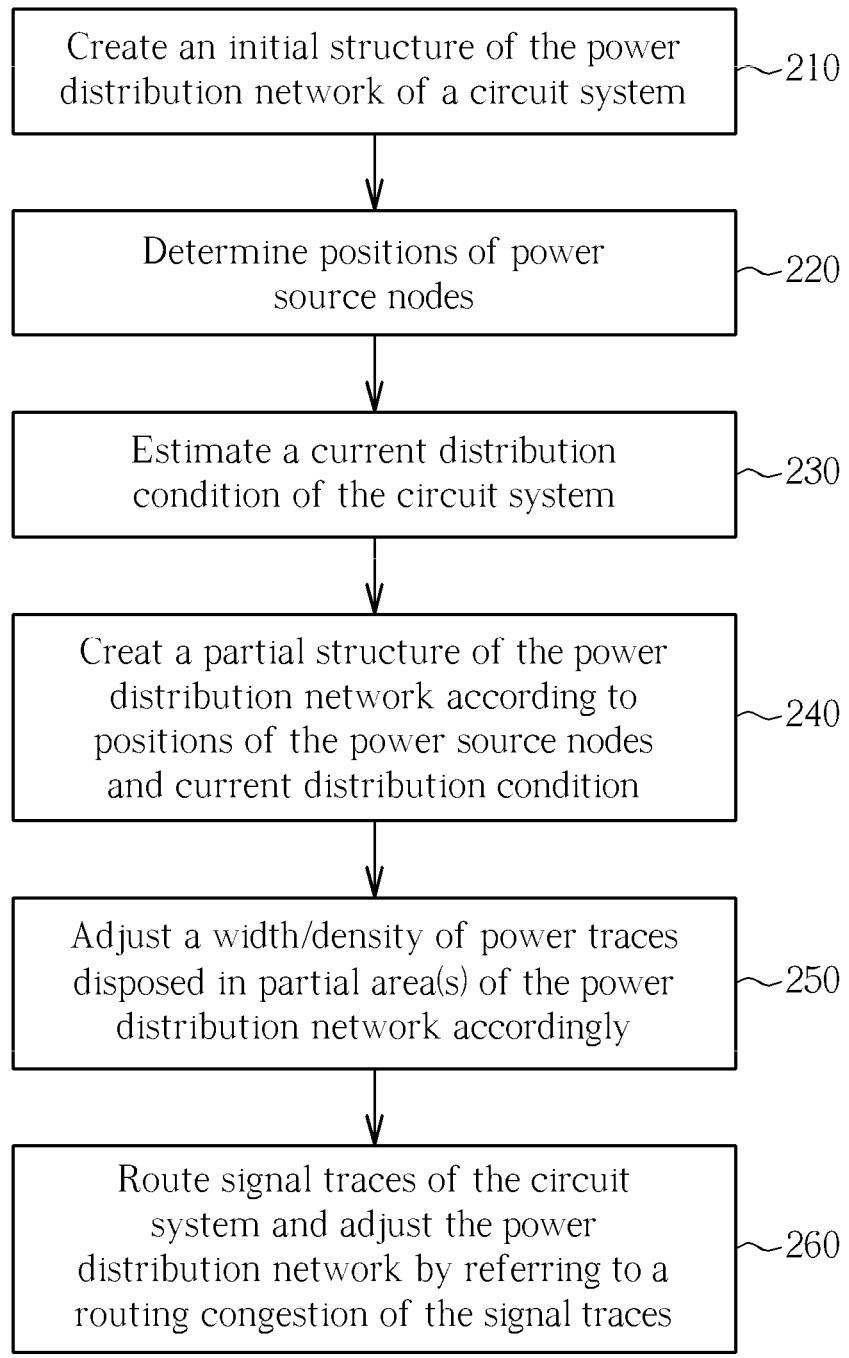
FIG. 2 is a flow chart illustrating a method for designing a power distribution network of a circuit system according to a first preferred exemplary embodiment of the present invention.

Please refer to FIG. 2. FIG. 2 is a flow chart illustrating a method for designing a power distribution network of a circuit system according to a first preferred exemplary embodiment of the present invention. Please note that the steps are not limited to be executed according to the exact order shown in FIG. 2. Moreover, STEPs 210, 230, 250 and 260 are optional steps and can be selectively operated according to different design requirements. The flow includes the following steps:

STEP 210: Create an initial structure of the power distribution network of a circuit system. For instance, create a mesh structure as illustrated in FIG. 1. By referring to the claims, the initial structure of the power distribution network can be the second part of the power distribution network. Please note STEP 210 is an optional step, which can be omitted in some embodiments.

STEP 220: Determine positions of a plurality of power source nodes. For a wire-bond chip, the power source nodes are power pads or ground pads of the chip; for a flip chip, the power source nodes are bumps such as power bumps or ground bumps of the flip chip. When the power source nodes corresponding to the power distribution network accepts a power voltage (e.g., VDD), the power distribution network is a power network; when the power source nodes corresponding to the power distribution network accepts a ground voltage (e.g., VSS), the power distribution network is a ground network.

STEP 230: Estimate a current distribution condition of the circuit system. For instance, according to different design requirements, the current distribution condition can be the current magnitude condition of the circuit system, the current paths of the circuit system, or the current density condition of the circuit system. STEP 230 is an optional step, however, which can be omitted in some embodiments.

STEP 240: Create at least a partial structure of the power distribution network according to at least the positions of the power source nodes. By referring to the claims, the partial structure of the power distribution network herein can be the first part of the power distribution network. For instance, enhance the partial structure of the power distribution network around the power source nodes. Since the current magnitude around the power source nodes would be bigger than other places of the power distribution network, enhancing the partial structure of the power distribution network around the power source nodes can effectively reduce IR drop and thus improve switching speeds of the circuit system. In addition, both the power source nodes positions and the current distribution condition can be concerned to create a partial structure of the power distribution network. That is, in STEP 240 one or both of the power source nodes positions and the current distribution condition can be referenced when creating at least a partial structure of the power distribution network. Moreover, the partial structure of the power distribution network which is near at least one of the power source nodes is for illustrative purposes only. All alternative designs which create at least a partial structure of the power distribution network according to the positions of the power source nodes and/or the current distribution condition fall within the scope of the present invention. In some embodiments, the partial structure of the power distribution network is enhanced to carry large current without electronic migration occurring. Traditionally, the current magnitude of the power distribution network near the current sources (i.e., power source nodes) is larger than the current magnitude of the power distribution network far away from the current sources, and the large current/large current density/excessive current density variation may lead to electronic migration around (the partial structure of) the power distribution network close to the power sources (VDD or VSS) which thereby damages corresponding power traces/ground traces. Furthermore, enhancing the partial structure of the power distribution network according to at least the positions of the power source nodes, for instance, by enlarging the width or the density of the partial structure of the power distribution network around power source nodes, can effectively reduce the resistance of the power traces constituting the power distribution network, to thereby moderate the IR drop of the circuit system. Besides, for diminish the IR drop of the power distribution network, enhancing the power traces of the partial structure of the power distribution network around the power source nodes is more effective than enhancing the power traces of the partial structure of the power distribution network away from the power source nodes. Then the power distribution network can occupy less area when being enhanced around the power source nodes.

STEP 250: Adjust a width of at least one power trace (and/or a density of power traces) disposed in some partial area(s) of the power distribution network, wherein the current distribution condition of the circuit system may indicate that the corresponding partial area has a current distribution parameter reaching a threshold value. For instance, when a current distribution parameter corresponding to a first partial area of the power distribution network is larger than the threshold value, the width of at least one power trace and/or a density of power traces of the first partial area of the power distribution network can be enhanced/increased accordingly. For example, the current distribution parameter can be a parameter indicating a current magnitude/current density/current density variation in some embodiments of the present invention. In this way, some partial areas of the power distribution network carrying larger currents can be adjusted/enhanced by increasing the width and/or density of power traces disposed in the these partial areas. That is, in the present invention, the partial areas (e.g., the first partial areas) of the power distribution network which have to bear large current magnitude/current density/current density variation will be enhanced by selectively enlarging at least a width of power trace(s) disposed in the partial area(s) of the power distribution network and/or by selectively increasing a density of the power traces disposed in the corresponding partial area, thereby protect the power distribution network from being damaged by the electronic migration. Furthermore, if a current distribution parameter corresponding to a second partial area of the power distribution network is smaller than a threshold value, the width of at least one power trace and/or a density of power traces of the second partial area of the power distribution network can be reduced accordingly. The current distribution parameter can be a parameter indicating current magnitude/current density/current density variation in some embodiments of the present invention. In this way, some partial areas of the power distribution network carrying fewer currents can be adjusted/reduced by reducing the width and/or density of power traces disposed in these partial area(s). By adjusting partial areas of the power distribution network, the area of the power distribution network can be reduced by diminishing the width and/or density of power traces disposed in the partial area which carries fewer currents while still considering electronic migration issues. In this way, more spaces of the metal wiring layers can be reserved for the following signal trace routing process. Please note that the magnitude of the threshold value for enhancing the structure of the power distribution network can be different from the magnitude of the threshold value for reducing the structure of the power distribution network according to the design requirements. All these alternative designs fall within the scope of the present invention. Please note STEP 250 is an optional step, which can be omitted in some embodiments.

STEP 260: Route signal traces of the circuit system, and adjust the power distribution network by referring to a routing congestion of the signal traces. For instance, if the spaces of signal traces are not enough, the density and/or at least a width of the power traces of the power distribution network can be properly reduced again; if there are still spare areas of the metal wiring layers after routing the signal traces, the spare areas of the metal wiring layers can be used to form more power traces. Since the structure of the signal traces and the process of the signal trace routing are well known by people skilled in this art, further descriptions are omitted here for the sake of brevity. Please note STEP 260 is an optional step, which can be omitted in some embodiments.

As mentioned above, the steps are not limited to be executed according to the exact order shown in FIG. 2 and can alter according to the design requirements. For instance, the order of STEP 210 and STEP 240 can vary. In a first exemplary embodiment, the initial structure of the power distribution network of a circuit system is created (STEP210), then a partial structure of the power distribution network is created according to at least the positions of the power source nodes (STEP240). While in another exemplary embodiment, a partial structure of the power distribution network is created according to at least the positions of the power source nodes (STEP240), and then the initial structure (e.g., mesh structure) of the power distribution network of a circuit system is created (STEP210). That is, by referring to the claims, both creating the first part of the power distribution network according to the second part, or creating the second part of the power distribution network according to the first part are allowable; all the alternative design obey and fall within the scope of the present invention.

By applying the method disclosed in the present invention, the partial areas of the power distribution network which have to bear large current magnitude/current density/current density variation can be enhanced by selectively enlarging a width of power trace(s) disposed in the partial area(s) of the power distribution network and/or by selectively increasing a density of the power traces disposed in the corresponding partial area, thereby protecting the power distribution network from being damaged by the electronic migration. Please note, since the structures of some partial areas of the power distribution network carrying fewer currents can be reduced accordingly, the area on the metal wiring layers can be used for the signal trace routing is also enlarged.

As mentioned above, the type of the circuit system is not a limitation of the present invention, and the power distribution network can be a ground network or a power network in different exemplary embodiments. Moreover, in a further exemplary embodiment, the method can be performed by executing the method by software on a computing device (e.g., a PC). All power distribution networks fashioned by determining positions of the power source nodes and then created according to at least the positions of the power source nodes, thereby leading to: less IR drop across the power distribution network; and prevention from damage due to electronic migration caused by large currents obey and fall within the scope of the present invention.

Figure 3:
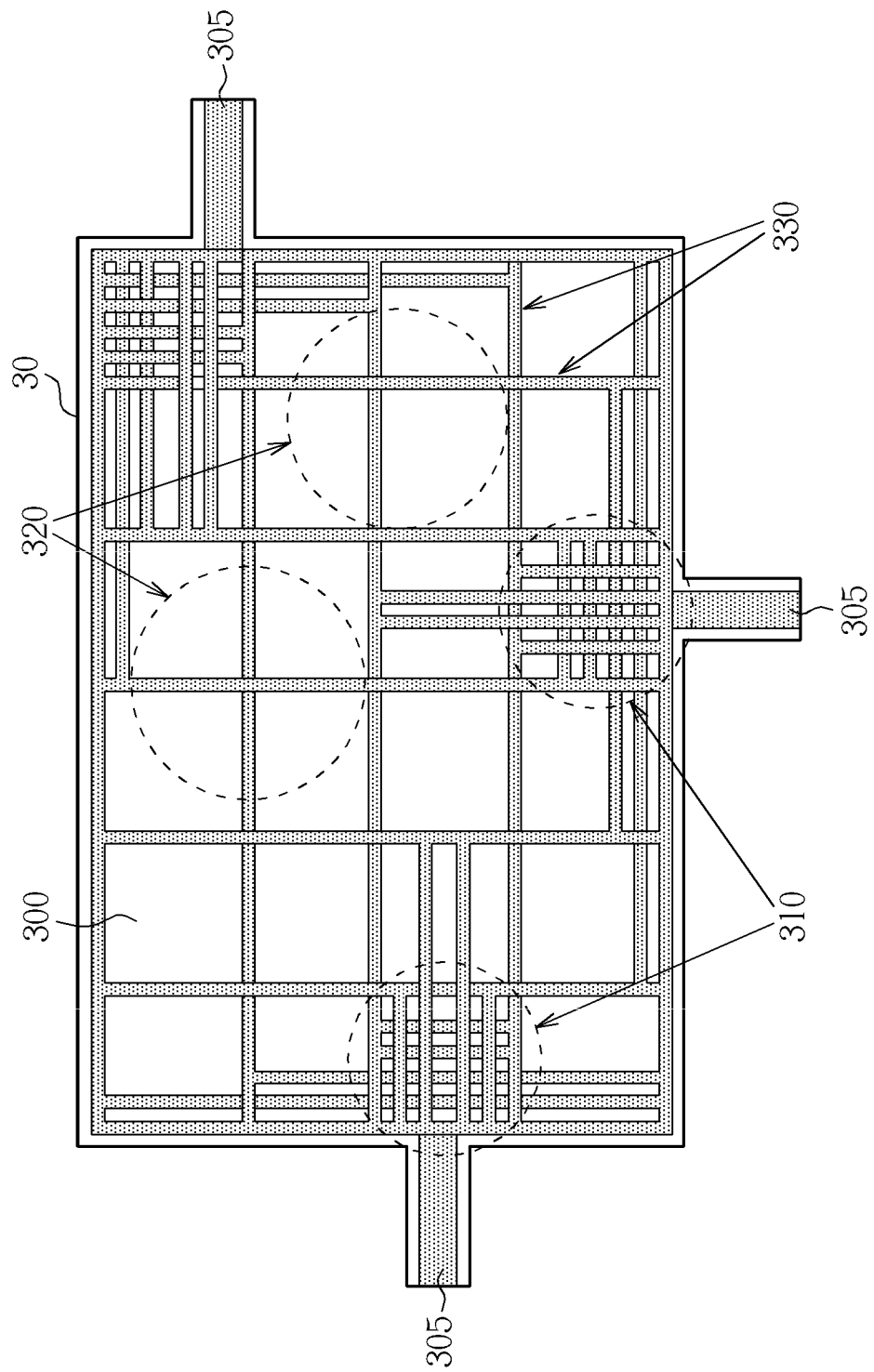
FIG. 3 is a diagram illustrating implementation details of a first embodiment of the circuit system having a power distribution network corresponding to FIG. 2 of the present invention.

Please refer to FIG. 3 in conjunction of FIG. 2; FIG. 3 is a diagram illustrating implementation details of a first embodiment of the circuit system having a power distribution network corresponding to FIG. 2 of the present invention. The circuit system 30 includes a plurality of power source nodes 305 and a power distribution network 300. The circuit system 30 can be a wire-bond chip, and power source nodes 305 can be power pads for providing a power voltage (e.g., VDD)/current or ground pads for providing a ground voltage (e.g., VSS) according to the design requirements. The power distribution network 300 is coupled to the power source nodes 305 and includes a plurality of power traces 330, which can be formed in at least one metal wiring layer of the circuit system 30. A density of power traces 330 disposed in first partial areas 310 is greater than a density of power traces 330 disposed in second partial areas 320. As shown in FIG. 3, a shortest distance among distances between the first partial areas 310 and the power source nodes 305 is shorter than a shortest distance among distances between the second partial areas 320 and the power source nodes 305. By providing the power distribution network 300 having enhanced structure according to at least the positions of the power source nodes 305, the IR drop across the power distribution network 300 is efficiently reduced and the robustness of power distribution network 300 is further ensured. Please note, when the power source nodes 305 accepts power voltage (e.g., VDD), the power distribution network is a power network. In an alternative design, when the power source nodes 305 coupled to the ground voltage (e.g., VSS), the power distribution network 300 is a ground network which has less ground bounce. Moreover, the number of power source nodes 305 is not a limitation of the present invention; all alternative designs fall within the scope of the present invention.

In addition, the circuit system 30 also realizes a structure wherein a density of power traces 330 decreases progressively corresponding to the distance from the power source nodes 305.

Figure 4:
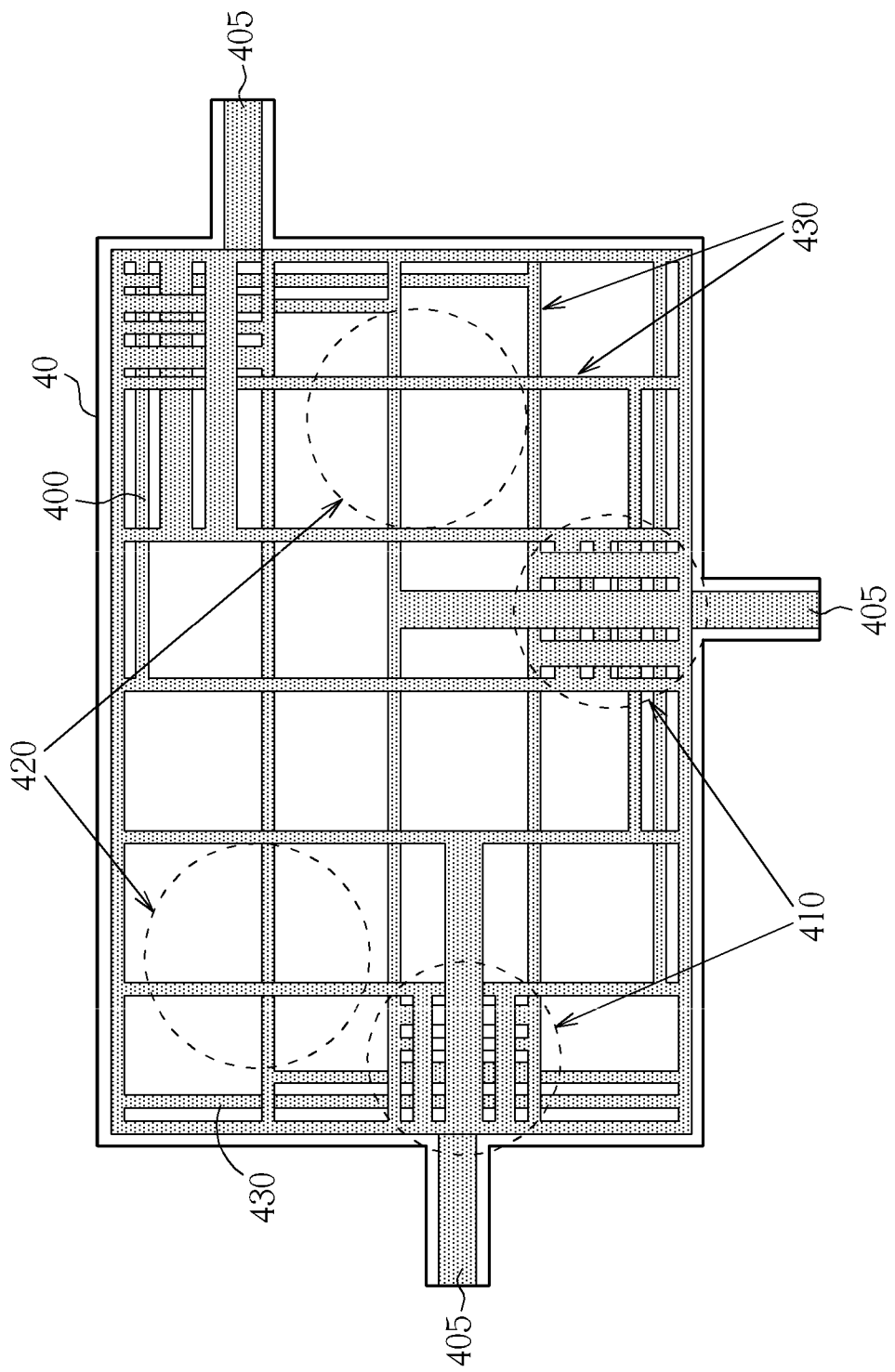
FIG. 4 is a diagram illustrating implementation details of a second embodiment of the circuit system having a power distribution network corresponding to FIG. 2 of the present invention.

Please refer to FIG. 4 in conjunction with FIG. 2 and FIG. 3. FIG. 4 is a diagram illustrating implementation details of a second embodiment of the circuit system having a power distribution network corresponding to FIG. 2 of the present invention. The circuit system 40 includes a plurality of power source nodes 405 and a power distribution network 400. The circuit system 40 can be a wire-bond chip, and power source nodes 405 can be power pads for providing a power voltage (e.g., VDD)/current or ground pads for providing a ground voltage (e.g., VSS). The power distribution network 400 is coupled to the power source nodes 405 and includes a plurality of power traces 430, and as is well known by people skilled in this art, the power traces 430 can be formed in at least one metal wiring layer of the circuit system 40. As shown in FIG. 4, at least a width of at least one of power traces 430 disposed in first partial areas 410 is greater than that of at least one of power traces 430 disposed in second partial areas 420. Furthermore, a shortest distance among distances between the first partial areas 410 and the power source nodes 405 is shorter than a shortest distance among distances between the second partial areas 420 and the power source nodes 405. By providing the power distribution network 400 having enhanced structure according to at least the positions of the power source nodes, the IR drop across the power distribution network 400 is efficiently reduced and the robustness of the power distribution network 400 is further ensured. Please note, when the power source nodes 405 accepts power voltage (e.g., VDD), the power distribution network is a power network. In an alternative design, when the power source nodes 405 coupled to the ground voltage (e.g., VSS), the power distribution network 400 is a ground network which has less ground bounce. Moreover, the number of the power source nodes 405 is not a limitation of the present invention. All alternative designs fall within the scope of the present invention.

Figure 5:
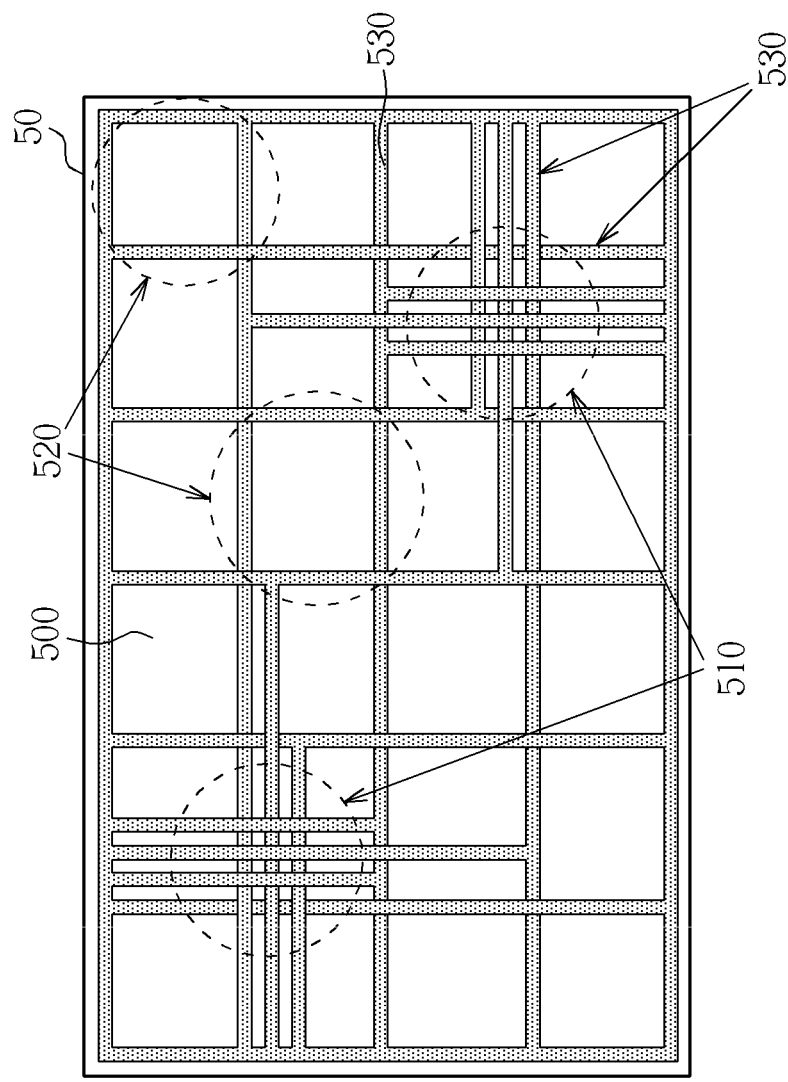
FIG. 5 is a diagram illustrating implementation details of a third embodiment of the circuit system having a power distribution network corresponding to FIG. 2 of the present invention.

Please refer to FIG. 5 in conjunction with FIG. 2. FIG. 5 is a diagram illustrating implementation details of a third embodiment of the circuit system having a power distribution network corresponding to FIG. 2 of the present invention. The circuit system 50 includes a plurality of power source nodes (not shown) and a power distribution network 500. The circuit system 50 can be a flip chip, and power source nodes can be power bumps for providing a power voltage (e.g., VDD)/current or ground bumps for providing a ground voltage (e.g., VSS). When the power source nodes accept power voltage (e.g., VDD), the power source nodes are power bumps and the corresponding power distribution network is a power network. Comparatively, when the power source nodes accept ground voltage (e.g., VSS), the power source nodes are ground bumps and the corresponding power distribution network is a ground network. The power distribution network 500 is coupled to the power source nodes and includes a plurality of power traces 530 placed in at least one metal wiring layer. As mentioned above, the power source nodes (not shown) connecting the power distribution network 500 can be power bumps when the power distribution network 500 is a power network for providing a power voltage, or can be ground bumps when the power distribution network 500 is a ground network for providing a ground voltage. In FIG. 5, at least a density of power traces 530 disposed in first partial areas 510 is greater than that of power traces 530 disposed in second partial areas 520 where a shortest distance among distances between the first partial areas 510 and the power source nodes is shorter than a shortest distance among distances between the second partial areas 520 and the power source nodes. That is, supposing that the power source nodes (e.g., power bumps or ground bumps) can be in the first partial areas 510, the density of power traces 530 disposed in first partial areas 510 can be greater than that of power traces 530 disposed in second partial areas 520, thereby prevent the EM effectively. Since the functions and the power bumps/ground bumps are well known by people skilled in this art, further descriptions are omitted of the sake of brevity. By providing the power distribution network 500 having enhanced structure according to at least the positions of the power source nodes (e.g., power bumps or ground bumps), the IR drop/ground bounce across the power distribution network 500 is efficiently reduced and the robustness of the power distribution network 500 is further ensured.

Figure 6:
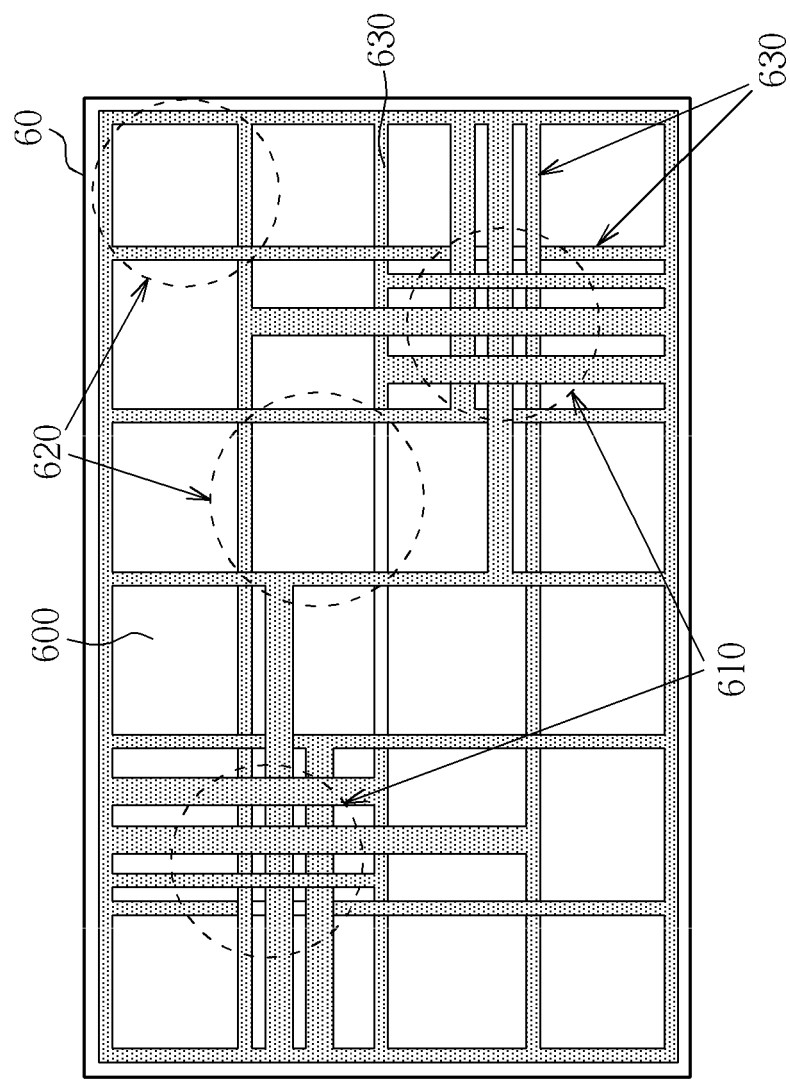
FIG. 6 is a diagram illustrating implementation details of a fourth exemplary embodiment of the circuit system having a power distribution network corresponding to FIG. 2 of the present invention.

Please refer to FIG. 6 in conjunction with FIG. 2 and FIG. 5. FIG. 6 is a diagram illustrating implementation details of a fourth exemplary embodiment of the circuit system having a power distribution network corresponding to FIG. 2 of the present invention. The circuit system 60 includes a plurality of power source nodes (not shown) and a power distribution network 600. The circuit system 60 can be realized by a flip chip, and power source nodes can be power bumps for providing a power voltage (e.g., VDD)/current or ground bumps for providing a ground voltage (e.g., VSS). The power distribution network 600 is coupled to the power source nodes and includes a plurality of power traces 630 placed in at least one metal wiring layer. The power source nodes (not shown) connecting the power distribution network 600 can be power bumps when the power distribution network 600 is a power network for providing a power voltage, or can be ground bumps when the power distribution network 600 is a ground network for providing a ground voltage. In FIG. 6, at least a width of at least one power trace 630 disposed in first partial areas 610 is greater than that of at least one power trace 630 disposed in second partial areas 620 where a shortest distance among distances between the first partial areas 610 and the power source nodes is shorter than a shortest distance among distances between the second partial areas 620 and the power source nodes. That is, supposing that the power source nodes (e.g., power bumps or ground bumps) can be in the first partial areas 610 of the power distribution network 600, at least a width of at least one power trace 630 disposed in first partial areas 610 can be greater than that of at least one power trace 630 disposed in second partial areas 620, thereby prevent the EM effectively. By providing the power distribution network 600 having enhanced structure according to at least the positions of the power source nodes, the IR drop/ground bounce across the power distribution network 600 is efficiently reduced and the robustness of the power distribution network 600 is further ensured.

Figure 7:
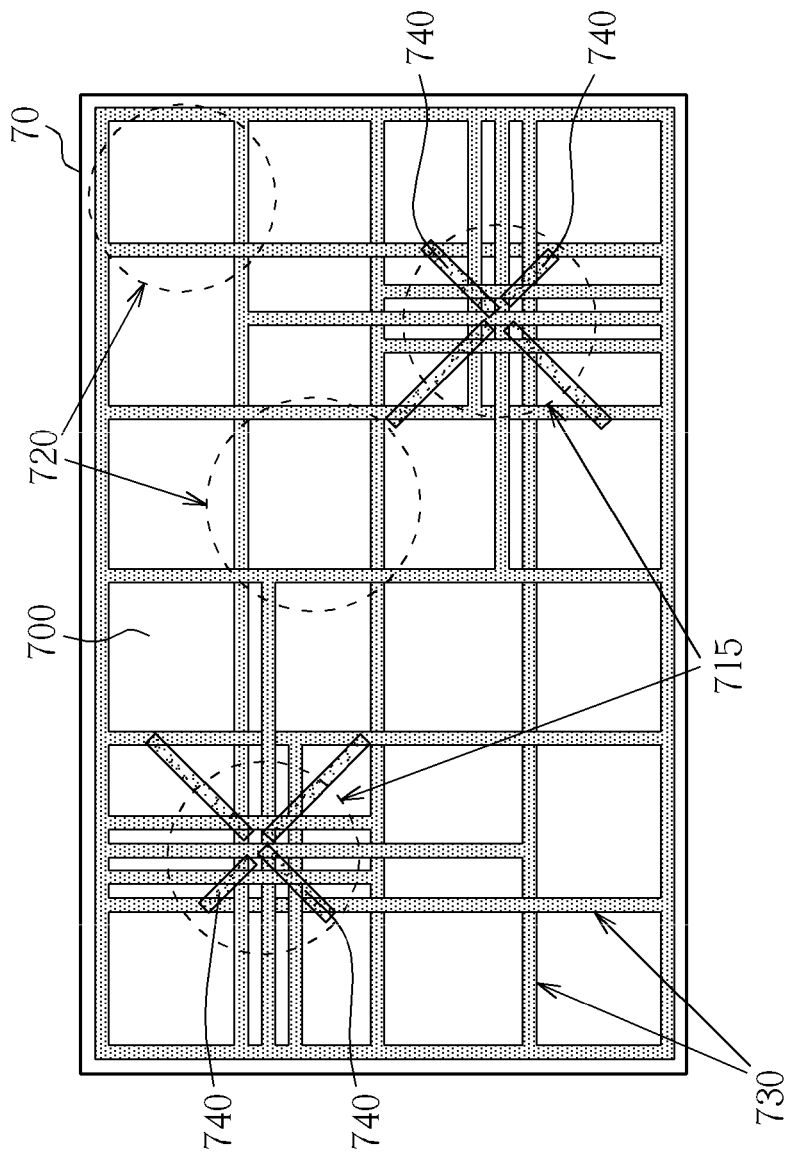
FIG. 7 is a diagram illustrating implementation details of a fifth exemplary embodiment of the circuit system having a power distribution network corresponding to FIG. 2 of the present invention.

Please refer to FIG. 7 in conjunction with FIG. 2. FIG. 7 is a diagram illustrating implementation details of a fifth exemplary embodiment of the circuit system having a power distribution network corresponding to FIG. 2 of the present invention. Similar to FIG. 5, the circuit system 70 includes a plurality of power source nodes (not shown) and a power distribution network 700. The circuit system 70 of FIG. 7 can be a flip chip, and power source nodes can be power bumps for providing a power voltage (e.g., VDD)/current or ground bumps for providing a ground voltage (e.g., VSS). The power distribution network 700 is coupled to the power source nodes and includes a plurality of power traces 730 placed in at least one metal wiring layer. The power source nodes (not shown) connecting the power distribution network 700 can be power bumps when the power distribution network 700 is a power network for providing a power voltage, or can be ground bumps when the power distribution network 700 is a ground network for providing a ground voltage. In FIG. 7, at least a density of power traces 730 disposed in first partial areas 715 is greater than that of power traces 730 disposed in second partial areas 720 where a shortest distance among distances between the first partial areas 715 and the power source nodes is shorter than a shortest distance among distances between the second partial areas 720 and the power source nodes. That is, supposing that the power source nodes (e.g., power bumps or ground bumps) can be in the first partial areas 715 of the power distribution network 700, the density of power traces 730 disposed in first partial areas 715 can be greater than that of power traces 730 disposed in second partial areas 720, thereby prevent the EM effectively. A main difference between FIG. 5 and FIG. 7 is that the power distribution network 700 in FIG. 7 can further include power traces 740 whose orientations have an angle different from the power traces 730. In addition, by using the power traces 740 which are neither horizontal nor vertical (such as the power traces 730), a shorter current path which has a comparatively smaller equivalent resistance is provided. When the power traces 740 is constructed and enhances, the EM can be even more effectively avoided and a robust power distribution network is achieved. However, the power traces 740 having different angles than other traces (e.g. 330-730) can also be applied into the aforementioned embodiments, and all these alternative designs fall within the scope of the present invention.

By referring to FIG. 2 to see FIG. 3-FIG. 7, at least one of the power source nodes positions and the current distribution condition can be referenced when creating at least a partial structure of the power distribution network. Moreover, the partial structure of the power distribution network which is near at least one of the power source nodes is for illustrative purposes only. All alternative designs which create at least a partial structure of the power distribution network according to the positions of the power source nodes and/or the current distribution condition fall within the scope of the present invention. Besides, as shown in FIG. 4 and FIG. 6, width and density of power traces around the power source nodes can both be increased for one power distribution network to enhance the power distribution network. Moreover, in some embodiments, the area of the power distribution network of the present invention can be smaller than that of traditional power network/ground network structures while the power network/ground network of the present invention has less IR drop/ground bounce.

Figure 8:
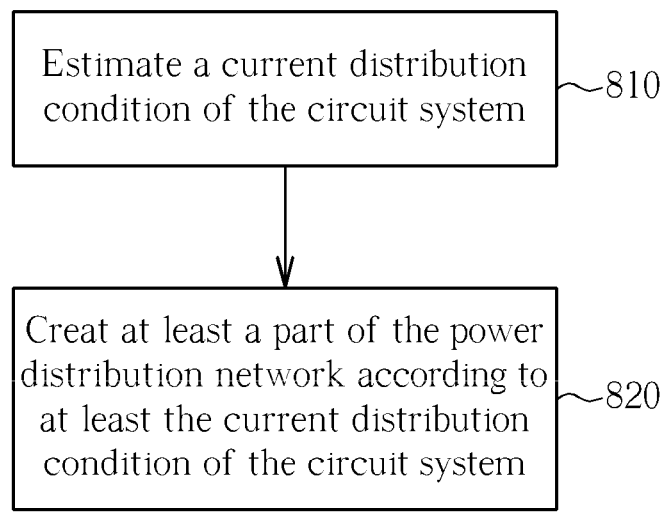
FIG. 8 is a flow chart illustrating the method for designing a power distribution network of a circuit system according to a second preferred exemplary embodiment of the present invention.

Please refer to FIG. 8. FIG. 8 is a flow chart illustrating a method for designing a power distribution network of a circuit system according to a second exemplary embodiment of the present invention. Please note that the steps are not limited to be executed according to the exact order shown in FIG. 8. The flow includes the following steps:

STEP 810: Estimate a current distribution condition of the circuit system. For instance, according to different design requirements, the current distribution condition can be the current magnitude condition corresponding to the circuit system, the current paths of the circuit system, the current density condition of the circuit system, or the current density variation value corresponding to the circuit system.

STEP 820: Create at least a part of the power distribution network according to at least the current distribution condition of the circuit system. In some embodiments, the structure of the power distribution network prevents the power distribution network from being damaged by electronic migration. Via this step, some areas of the power distribution network which have to carry large current magnitude/current density/current density variation will be enhanced by selectively enlarging a width of power trace(s) disposed in the partial area(s) of the power distribution network or by selectively increasing a density of the power traces disposed in the corresponding partial area to thereby protect the power distribution network from being damaged by the electronic migration. The partial area(s) can be determined by comparing a current distribution parameter with a threshold value and adjusting the partial area(s) correspondingly. The current distribution parameter can be a parameter indicating a current magnitude/current density/current density variation in some embodiments of the present invention. For instance, the density of the power traces disposed in the partial area of the power distribution network and/or the width of at least one power trace disposed in the partial area can be reduced/enhanced if necessary. All these alternative designs obey and fall within the scope of the present invention.

The aforementioned method designs a power distribution network according to the corresponding current distribution condition. The method can adjust (enlarge or reduce) a width and/or density of power traces disposed in the partial area of the power distribution network when the current distribution condition of the circuit system indicates that the partial area has a current distribution parameter reaching a threshold value. The type of circuit system having the power distribution network created according to a current distribution condition is not a limitation of the present invention: for instance, the circuit system can be a wire-bond chip or a flip chip. These aforementioned alternative designs obey and fall within the scope of the present invention.

In conclusion, the circuit system (e.g., chip) applying the power distribution network designed according to the present invention has more balanced current density when the IR drop/ground bounce of the power distribution network is reduced. More particularly, since the partial area of the power distribution network is enhanced by referring to at least on of the power source locations or the current distribution condition, a robust power distribution network with a more balanced current density and a lower IR drop is thereby provided. In addition, the circuit system applying the disclosed power distribution network can be free from damage caused by electronic migration while a minimum area of the power distribution network is realized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A circuit system, comprising:
a plurality of power source nodes; and
a power distribution network, coupled to the power source nodes and comprising a plurality of power traces;
wherein the power source nodes receive a voltage for the power distribution network; at least one of the power source nodes corresponds to a first partial area of the power distribution network, a density of power traces disposed in the first partial area is greater than a density of power traces disposed in a second partial area of the power distribution network, and a shortest distance among distances between the first partial area and the at least one of the power source nodes is shorter than a shortest distance among distances between the second partial area and the at least one of the power source nodes.

2. The circuit system of claim 1, wherein the circuit system is a wire-bond chip, and the power source nodes are power pads or ground pads of the wire-bond chip.

3. The circuit system of claim 1, wherein the circuit system is a flip chip, and the power source nodes are power bumps or ground bumps of the flip chip.

4. The circuit system of claim 1, wherein the density of power traces is the number of power traces in the corresponding area.

5. The circuit system of claim 1, wherein the density of power traces is a total width of the power traces in the corresponding area.

6. A method for manufacturing a power distribution network of a circuit system, comprising:
manufacturing a plurality of power source nodes, wherein the power source nodes receive voltage for the power distribution network;
manufacturing a first partial area of the power distribution network corresponding to at least one of the power source nodes; and
manufacturing a second partial area of the power distribution network;
wherein a density of power traces disposed in the first partial area is greater than a density of power traces disposed in the second partial area, and a shortest distance among distances between the first partial area and the at least one of the power source nodes is shorter than a shortest distance among distances between the second partial area and the at least one of the power source nodes.

7. The method of claim 6, wherein the density of power traces is the number of the power traces in the corresponding area.

8. The method of claim 6, wherein the density of power traces is a total width of the power traces in the corresponding area.

9. The method of claim 6, further comprising:
estimating a current distribution condition of the circuit system;
adjusting a density of at least one power trace disposed in a partial area of the power distribution network, wherein the current distribution condition of the circuit system indicates that the partial area has a current distribution parameter reaching a threshold value.

10. The method of claim 9, wherein the current distribution condition comprises a current density of the circuit system.

11. The method of claim 9, wherein the step of adjusting the density of at least one power trace disposed in the partial area of the power distribution network further comprising:
increasing the density of at least one power trace disposed in the partial area of the power distribution network, wherein the current distribution condition of the circuit system indicates that the partial area has a current distribution parameter reaching a threshold value.

12. The method of claim 9, wherein the step of adjusting the density of at least one power trace disposed in the partial area of the power distribution network further comprising:
reducing the density of power traces disposed in the partial area of the power distribution network, wherein the current distribution condition of the circuit system indicates that the partial area has a current distribution parameter reaching a threshold value.

13. The method of claim 6, further comprising:
routing signal traces of the circuit system; and
adjusting the power distribution network by referring to a routing congestion of the signal traces.

* * * * *